United States Patent
Zhang et al.

(10) Patent No.: US 8,541,981 B2
(45) Date of Patent: Sep. 24, 2013

(54) LOW-VOLTAGE DUAL-POWER-PATH MANAGEMENT ARCHITECTURE FOR RECHARGEABLE BATTERY MONITORING SOLUTIONS

(75) Inventors: Weibiao Zhang, Plano, TX (US); J. Randall Cooper, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 245 days.

(21) Appl. No.: 12/943,326

(22) Filed: Nov. 10, 2010

(65) Prior Publication Data
US 2012/0112686 A1 May 10, 2012

(51) Int. Cl.
*H02J 7/00* (2006.01)
(52) U.S. Cl.
USPC ............................. 320/134; 320/135; 320/136
(58) Field of Classification Search
USPC ................................................. 320/134–136
See application file for complete search history.

(56) References Cited

U.S. PATENT DOCUMENTS

| | | | |
|---|---|---|---|
| 4,290,002 A | 9/1981 | Piotti | |
| 4,782,241 A | 11/1988 | Baker et al. | |
| 5,703,463 A | 12/1997 | Smith | |
| 5,789,900 A * | 8/1998 | Hasegawa et al. | 320/132 |
| 2006/0120007 A1* | 6/2006 | Legatti | 361/160 |
| 2007/0103143 A9* | 5/2007 | Ooshita et al. | 324/134 |
| 2010/0013321 A1 | 1/2010 | Onishi et al. | |

OTHER PUBLICATIONS

Datasheet, bq24072, bq073, bq074, bq075, bq079, 1.5A USB-Friendly Li-Ion Battery Charger and Power-Path Management IC, Texas Instruments Incorporated, Dallas, Texas, USA, Sep. 2008—Rev. Jun. 2009.
Mauney, "Designing a linear Li-Ion battery charder with power-path control", Texas Instruments Incorporated, Dallas, Texas, USA,, 2009.
PCT Search Report mailed Aug. 2, 2012.

* cited by examiner

*Primary Examiner* — Samuel Berhanu
(74) *Attorney, Agent, or Firm* — William B. Kempler; W. James Brady, III; Frederick J. Telecky, Jr.

(57) ABSTRACT

A control circuit of a battery power-path management circuit establishes a first power path between a battery input node and an output node when the input node voltage is larger than a charger input node voltage and a second power path between the charger input node and the output node when the voltage on the charger input node is larger than the battery input node voltage. It controls the second power path to provide power to the output node, enabling battery charging and protection over a battery voltage range from about zero volts. It has low power consumption and can support wide-swing power supply voltage from as low as one volt to as high as maximum allowed Vds of drain-extended devices. It can use smaller device sizes because the PMOS switch gate voltage is 0V when the power supply is not too high.

18 Claims, 7 Drawing Sheets

LOW-VOLTAGE DUAL-POWER-PATH MANAGEMENT ARCHITECTURE FOR RECHARGEABLE BATTERY MONITORING SOLUTIONS

BACKGROUND

1. Field

The various circuit embodiments described herein relate in general to circuits and methods for battery power-path management, and, more specifically, to circuits and methods of the type described for monitoring, charging, and protecting rechargeable batteries across a wide range of operating voltages and conditions, including low battery voltage conditions.

2. Background

A rechargeable battery pack is a critical block for many electronic products, such as personal computers, camcorders, digital cameras, cell phones, handheld power tools, and the like. Due to its high capacity, the battery pack needs to be monitored and protected against various fault conditions that could lead to catastrophic failure of the battery. Battery power-path management is a critical block for providing such protection functions.

Figure 1:
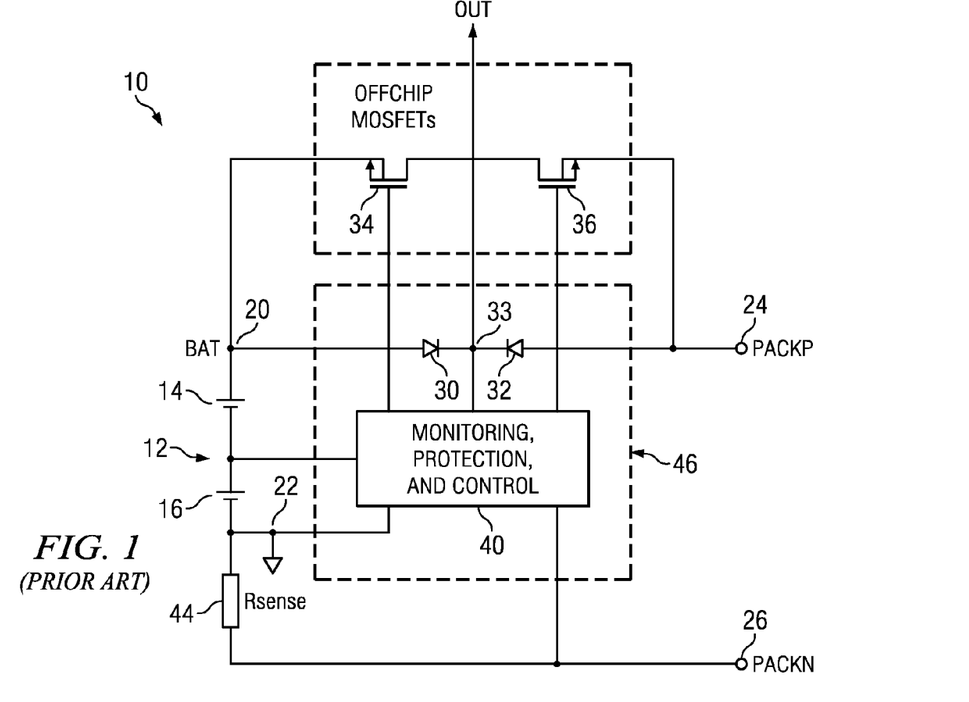
FIG. 1 shows a power-path management circuit of the prior art.

A typical power-path management circuit 10 is shown in FIG. 1 to which reference is first made. The power-path management circuit 10 is used in conjunction with a rechargeable battery 12, which includes one or more battery cells, two battery cells 14 and 16 being shown for illustration, connected between the BAT terminal and ground 22. The charger voltage is connected between the PACKP and PACKN terminals 24 and 26.

Traditional power-path management uses a diode-OR function of the PACKP and BAT voltages, "PACKP" referring to the charger voltage and "BAT" referring to the battery voltage of the battery being recharged. Thus, a pair of diodes 30 and 32 are connected between the BAT terminal 20 and the PACKP terminal 24, with their cathodes connected at node 33 at which the output voltage from the circuit 10 is derived.

A pair of MOSFET transistors 34 and 36 is also connected between the BAT terminal 20 and the PACKP terminal 24, the gates of which are controlled by drivers (not shown) in the monitoring, protection, and control block 40. The MOSFETs 34 and 36 are used generally for protecting the battery 12 from fault conditions, for example, an overvoltage of a possible bad charger. Thus, the MOSFETs 34 and 36 are controlled to be off when over-current, over-voltage or under-voltage faults occur.

Finally, a sense resistor 44 is connected between the PACKN terminal 26 and the ground terminal 22. Typically, the sense resistor 44 and the MOSFET transistors 34 and 36 are relatively large components, and are provided separately from the circuit 46 containing the monitoring, protection, and control block 40 and the diodes 30 and 32, for example, on a printed circuit board (not shown), or the like, associated with the battery pack with which the circuitry is used.

In operation, if the charger voltage at the PACKP terminal 24 is higher than the battery voltage at the BAT terminal 20, then PACKP-Vd is used as the output voltage on node 33 (Vd being the voltage drop across one of the diodes 30 or 32). On the other hand, if the charger voltage is removed, and the voltage at the BAT terminal 20 is higher than the voltage at the PACKP terminal 24, then BAT-Vd is used as the output voltage on node 33.

Figure 2:
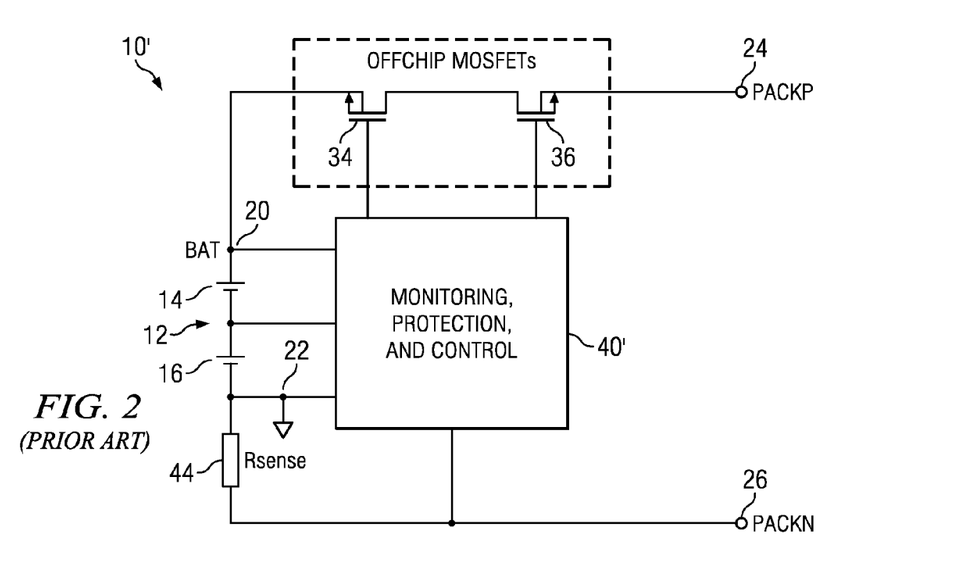
FIG. 2 shows an example prior art power-path management circuit illustrating one way to lower the minimal operating voltage.

However, for applications that require low battery voltage such as 1.8V, the diode voltage drop, Vd, (normally around 0.6V) is too big, since the circuits operating from the voltage on node 33 will need at least 1.8V to operate correctly. One way to lower the minimal operating voltage is to directly connect the battery to the monitoring, protection, and control block 40' as shown in the circuit 10' in FIG. 2, to which reference is now additionally made. In this circuit arrangement, if the battery voltage is merely low, it will be charged up from the PACKP node by a charger, but when the battery is deeply-discharged, an instantaneous system power-up is generally not possible because the circuits of the internal monitoring, protection, and control block 40' are not operational. That is, the battery voltage has to be high enough to activate the monitoring, protection, and control block 40'. In addition, some functions, such as protecting the battery when it is too low, are hard to implement. Indeed, some applications require that the system be powered-up by the charger when the battery is deeply discharged.

Other power-path management techniques have been advanced, for example, in integrated circuit charger systems. For instance, a circuit 50 in FIG. 3, to which reference is now additionally made, shows one example that controls PMOS gate and backgate terminal voltages in order to regulate charger outputs. The circuit includes PMOS transistors 52 and 54 in the power-path between the AC and USB inputs 56 and 58 and the output node 60. Still, a diode-OR circuit formed of diodes 62 and 64 is connected between the AC and USB inputs 56 and 58, with their cathodes connected to a bandgap voltage regulator 66. The bandgap voltage regulator 66 provides a regulated output on line 68, for example, of 2.5V, which serves as a reference voltage which is compared to the output voltage on output node 60 by operational amplifiers 70 and 72 to control the respective gates of PMOS transistors 52 and 54. The diodes 62 and 64 again introduce a diode drop, Vd, thereby limiting the low voltage operation of the circuit.

Figure 3:
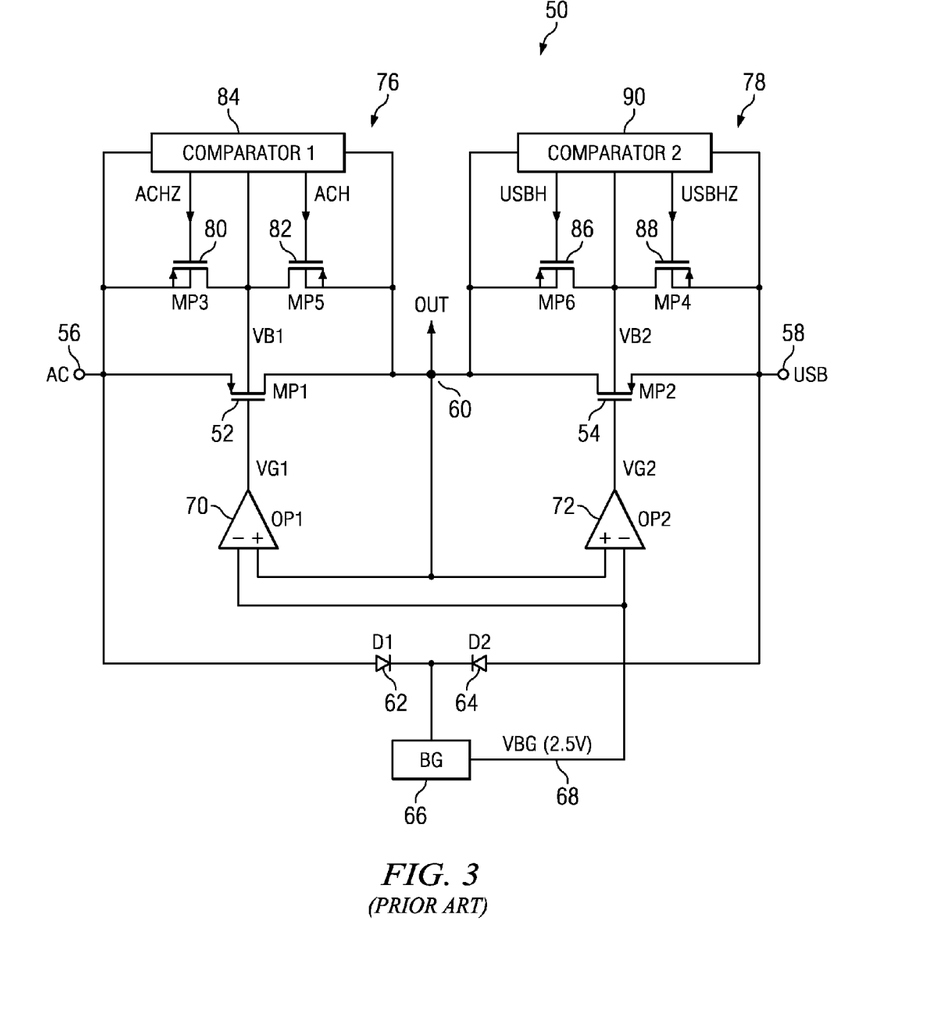
FIG. 3 shows an example power-path management circuit of the prior art that controls PMOS gate and backgate terminal voltages in order to regulate charger outputs.

The voltage on the backgates of the PMOS transistors 52 and 54 are controlled by comparator circuits 76 and 78. The comparator circuit 76 includes a pair of PMOS transistors 80 and 82 connected between the AC input 56 and the output node 60. A comparator 84 is also connected between the AC input 56 and the output node 60 to control the backgate of PMOS transistor 52, as explained more fully below.

Similarly, the comparator circuit 78 includes a pair of PMOS transistors 86 and 88 connected between the output node 60 and the USB input 58. A comparator 90 is also connected between the output node 60 and the USB input 58 to control the backgate of PMOS transistor 54, as explained more fully below.

In operation, the comparator 84 compares voltages on the AC input terminal 56 and the output node 60 to decide if the input voltage at AC is greater than the output voltage, OUT. The comparator 84 is configured so that if the input voltage at AC is greater than the output voltage, OUT, then ACH=1 and ACHZ=0. This connects the backgate of PMOS transistor 52 to the AC input terminal 56, and powers the operational amplifier 70 to regulate the voltage on the output node 60 to be some programmed value (for example, 4.2V).

Similarly, if the USB input 58 is selected, then the comparator 90 compares the voltage on the USB input 58 with the voltage on the output node 60 to decide if the input voltage at USB is greater than the output voltage, OUT. The comparator 90 is configured so that if the input voltage at USB is greater than the output voltage, OUT, then USBH=1 and USBHZ=0, this connects the backgate of PMOS transistor 54 to the USB input 58 and powers the operational amplifier 72 to regulate the output voltage on node 60 to be some programmed value (again, for example, 4.2 V).

This architecture works well for integrated circuit charger systems, but it is not directly useful in battery monitoring systems, for several reasons. First, the voltage regulation of the circuit 50 needs a reference voltage, VBG, from the bandgap voltage regulator 66, which has to be powered from diode-or of the AC and USB inputs 56 and 58. This requires the voltages on the AC and USB inputs 56 and 58 to have enough headroom for the bandgap. Although it is good for charger applications where the minimum voltages on the AC or USB inputs 56 and 58 are higher than 4.3V, input power supplies for battery monitoring solutions do not always meet that. More and more applications in battery monitoring solutions area require power supply voltages of at least 2V, or so, to support new battery systems.

Secondly, the amplifiers and the bandgap circuits may consume some power that is appropriate for charger applications but not acceptable for battery monitoring applications. Battery monitoring systems tend to have more stringent power consumption requirements which are considered as overhead. As long as the voltage on the AC or USB inputs 56 and 58 are in a normal range (for example, greater than 4.3V), the operational amplifiers and bandgap circuits are consuming power for the regulation.

What is needed is power-path management circuits and methods that support precharge functions for a battery with as low as 0 volts, that support normal operation, even if the battery is as low as 0 volts, that provide a proper power-path during unexpected events such as short-circuit in discharge, come-and-go keychain short or brown-out events, over-current in charge, and over-current in discharge, that provide normal fast charge and normal discharge functions, and that are suitable for use in battery monitoring solutions.

SUMMARY

A circuit architecture for dual-power-path management for rechargeable battery monitoring solutions is described. Compared to old techniques, the circuit enables lower minimum operating voltages of battery cells and prolongs the battery lifetime. It supports powering up the system with as low as zero volt battery cells, and supports the zero volt battery pre-charging and normal charging. With big capacitors added to the output node and the low-drop-out regulator (LDO) output, it can also survive brown-out or keychain short events.

Thus, according to an embodiment of a battery power-path management circuit, a control circuit establishes a first power path between a battery input node and an output node when a voltage on the battery input node is larger than a voltage on a charger input node, and establishes a second power path between the charger input node and the output node when the voltage on the charger input node is larger than a voltage on the battery input node. The control circuitry is configured to control the second power path to provide power to the output node to enable charging and protecting a battery connected to the battery input node over a battery voltage range extending to about zero volts.

The control circuitry includes circuitry for controlling respective gates and backgates of first and second PMOS transistor switches and circuitry for connecting the charger input node to the battery input node when a voltage on the charger input node is larger than a voltage on the battery input node. The power-path management circuit also includes at least one voltage storage device to provide a voltage to the output node in the event of a brownout occurrence.

According to another embodiment of a battery power-path management circuit a first switch is connected between a battery input node and an output node and a second switch is connected between a charger input node and the output node. A control circuit is connected to control the first and second switches to connect the battery input node to the output node when a voltage on the battery input node is larger than a voltage on the charger input node, and to connect the charger input node to the output node when the voltage on the charger input node is larger than the voltage on the battery input node. The control circuitry is configured to control the switches to enable a battery connected to the battery input node to provide power to the output node between about 0.6 volts and about zero volts.

The battery power-path management circuit includes circuitry for connecting the charger input node to the battery input node when a voltage on the charger input node is larger than a voltage on the battery input node, and also includes at least one voltage storage device to provide a voltage to the output node in the event of a brownout occurrence.

According to an embodiment of a method for controlling a power-path between a battery input node, a charger input node, and an output node a first power path is established between the battery input node and the output node when a voltage on the battery input node is larger than a voltage on the charger input node, and a second power path is established between the charger input node and the output node to enable a charger connected to the charger input node to provide power to the output node over a battery voltage range extending to about zero volts. The method also includes establishing a third power path between the charger input node and the battery input node when the voltage on the charger input node is larger than the voltage on the battery input node.

BRIEF DESCRIPTION OF THE DRAWINGS

In the various figures of the drawing, like reference numbers are used to denote like or similar parts.

DETAILED DESCRIPTION

Figure 4:
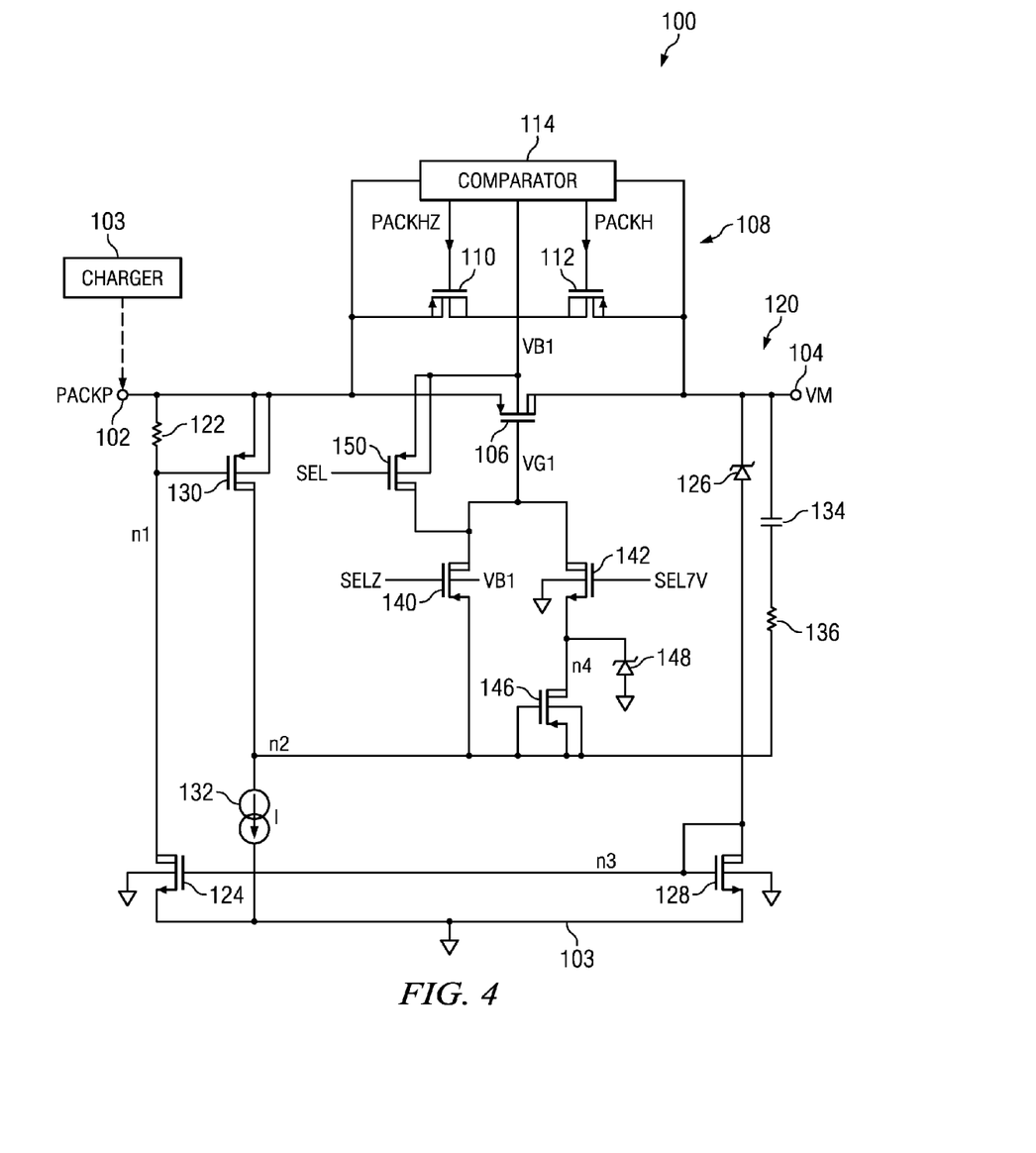
FIG. 4 shows a portion of a circuit embodiment for power-path management using switch-type MOSFETs.

A power-path management approach is to use switch-type MOSFETs for power path management, is shown in FIG. 4, to which reference is additionally made. The power path management circuit 100 of FIG. 4 shows the charger side of a management circuit connected between a charger input node 102 and a circuit output node (VM) 104. The current between the charger input node 102 and the circuit output node 104 is controlled by a switch-type p-channel MOSFET (PMOS device) 106.

The backgate of the PMOS device 106 is controlled by a circuit 108 connected between the charger input node 102 and the circuit output node 104. The circuit 108 has first and second PMOS devices 110 and 112, having their sources connected to the backgate of the PMOS device 106 and their drains connected respectively to the charger input node 102 and the circuit output node 104. A comparator 114 is connected to the charger input node 102, the circuit output node 104, and the backgate of the PMOS device 112, and is configured to produce a high output signal to the gate of PMOS device 112 and a low output signal to the gate of PMOS device 110 when the input voltage, PACKP, for example from a charger 103, on charger input node 102 is above the voltage on the output node 104.

The gate of the PMOS device 106 is controlled by a circuit 120, which includes a current mirror formed of a first current path including a resistor 122 and an n-channel MOSFET (NMOS device) 124 connected between the charger input node 102 and ground 103, and a second current path including a zener diode 126 and an NMOS device 128 connected between the output node 104 and ground 103. A PMOS device 130 and current source 132 are connected in series across the first current path, with the gate of the PMOS device 130 connected between the resistor 122 and the drain of the NMOS device 124. A capacitor 134 and resistor 136 are connected in series between the output node 104 and the drain of PMOS device 130.

The gate of the PMOS device 106 is connected to the drain of PMOS device 140 and the drain of NMOS device 142, and a PMOS device 146 is connected between the source of the NMOS device 142 and the drain of PMOS device 130. A zener diode 148 is connected from a node between the source of NMOS device 142 and drain of PMOS device 146 to ground 103. The gate of NMOS device 142 is connected to a reference potential, for example, 7 volts. A PMOS device 150 is connected between the gate and the backgate of the PMOS device 106. The gate of PMOS device 150 is connected to a select line "SEL" and the gate of PMOS device 140 is connected to an inverted select line "SELZ," which are controlled by a select signal source, not shown.

In operation, when the voltage PACKP of the power supply connected to the input node 102 is normal but not too high, then the switch-type PMOS device 106 is turned on. When the voltage of the power supply is higher than some value (for example a maximum safe operating voltage for internal circuits), then the internal power is clamped so that it will not overstress the internal circuits.

In the circuit 100, the MOS devices are drain extended, enabling them to support a high absolute voltage between their drains and sources, and between their drains and gates. Nevertheless, the maximum gate to source voltage allowed is still the same as the normal MOS devices.

PMOS devices 106, 110, and 112 form the power path from the power supply voltage, PACKP, on the charger input node 102 to the internal power signal VM on output node 104. The PMOS devices 150, 140, and 146 and NMOS device 142 are switches that control the gate voltage of the PMOS device 106. Zener diodes 148 and 126 have a relatively high voltage breakdown, for example 7V.

When the power path is enabled, SEL=1, SELZ=0, and SEL7V=1 with proper voltage potential. Then, the switch-type PMOS devices 106 and 140 are turned on, the voltage, VG1, on the gate of the PMOS device 106 has the same voltage potential as the node n2. If the output voltage, VM, on output node 104 is lower than the breakdown voltage of the zener diode 126, then there are no currents through the drains of NMOS devices 124 and 128, and the node n1 is pulled up to the input voltage, PACKP, on the charger input node 102. PMOS device 130 is off, and n2 is pulled down by the current source 132 to ground 103. The gate of PMOS device 106 is pulled low to turn on the path between the charger input node 102 and the output node 104, and the output voltage, VM, is about equal to the input voltage, PACKP. Since the PMOS device 106 is used as a switch, its device size can be smaller than that used as the regulated device described above with reference to FIG. 3.

When the power path is selected and the input voltage, PACKP, is low, at first, then output voltage, VM, will follow PACKP. As the PACKP voltage becomes higher and higher, the output voltage, VM, will follow until the zener diode 126 breaks down. Then a current through the zener diode 126 and NMOS device 128 will be mirrored through NMOS device 124 to pull down n1 and pull up n2. As a result, the voltage on the gate of PMOS device 106 will be pulled up. Then the output voltage, VM, on output node 104 will be clamped to a voltage around Vzd126+Vt2, where Vzd126 is the voltage on zener diode 126, about 7V, and Vt128 is the threshold voltage of PMOS device 128 (for example, 0.5V). The current mirror is not on, until the output voltage, VM, is as high as 7V, so the power consumption of this architecture is very low (for example, 2~3 μA when PACKP voltage is as high as 40V).

The zener diode 148 is used to clamp the voltage on n4 to protect the NMOS device 142 from breaking down from its source to backgate. The PMOS device 146 is used as a diode to protect the NMOS device 142 if the voltage on n2 is too high.

On the other hand, when the power path is not selected, then the PMOS device 150 is on, PMOS device 146 and NMOS device 142 are off, VG1=VB1, and the path is disabled.

Thus, the power path management circuit 100 in FIG. 4 has much lower power consumption than the circuit of FIG. 3, can support wide-swing power supply voltage, from as low as 1+ volts to as high as maximum allowed Vds of drain-extended devices (40V for some BiCMOS processes). Also, it has the ability to use smaller device sizes because the PMOS switch gate voltage is 0V when the power supply is not too high.

Figure 5:
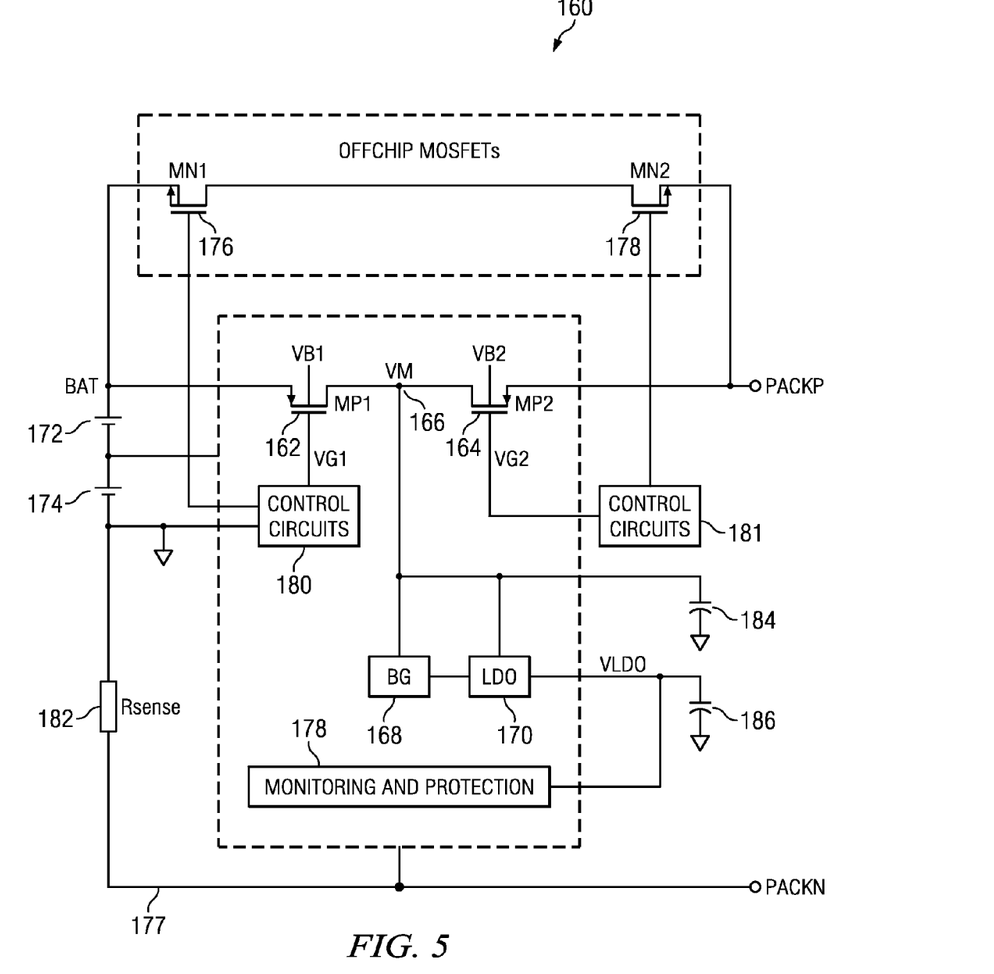
FIG. 5 shows an embodiment of a circuit for power-path management that uses the power path management method of the circuit of FIG. 4.

FIG. 5, to which reference is now additionally made shows an example architecture 160 that uses the power path management method of the circuit 100 of FIG. 4. Two PMOS switches 162 and 164 are used to select either the battery voltage, BAT, or the input voltage, PACKP, as the power source VM on node 166 for the internal bandgap circuit block, BG, 168 and the low-drop-out regulator, LDO, 170. The battery voltage is provided by battery cells 172 and 174, and a pair of off chip MOSFETS 176 and 178 are controlled by control circuitry 180 and 181. A sense resistor 182 is connected between the battery 174 and a reference potential 177, such as a PACKN voltage. A monitoring and protection circuit 178 monitors the voltage of the low-drop-out regulator 170.

Some applications require that when a short circuit event occurs and both the input voltage, PACKP, and the battery voltage, BAT, drop very low for a couple of milliseconds, the system should survive without interruption or losing protection. A short circuit may be caused, for instance by a "keychain short" or power brownout. Thus, to assure the survival of the system, a voltage storage capability is included by external capacitors 184 and 186. The capacitor 184 helps in brownout conditions and maintains the stability of the power paths from either PACKP to VM or BAT to VM when PACKP or BAT are higher than 7V. The capacitor 186 maintains the stability of the low-drop-out regulator 170 but also stores some charge for providing power to the output node 166 when both PMOS devices 162 and 164 are off and both the battery voltage, BAT, and the input voltage, PACKP, drop to as low as 0V.

Figure 6:
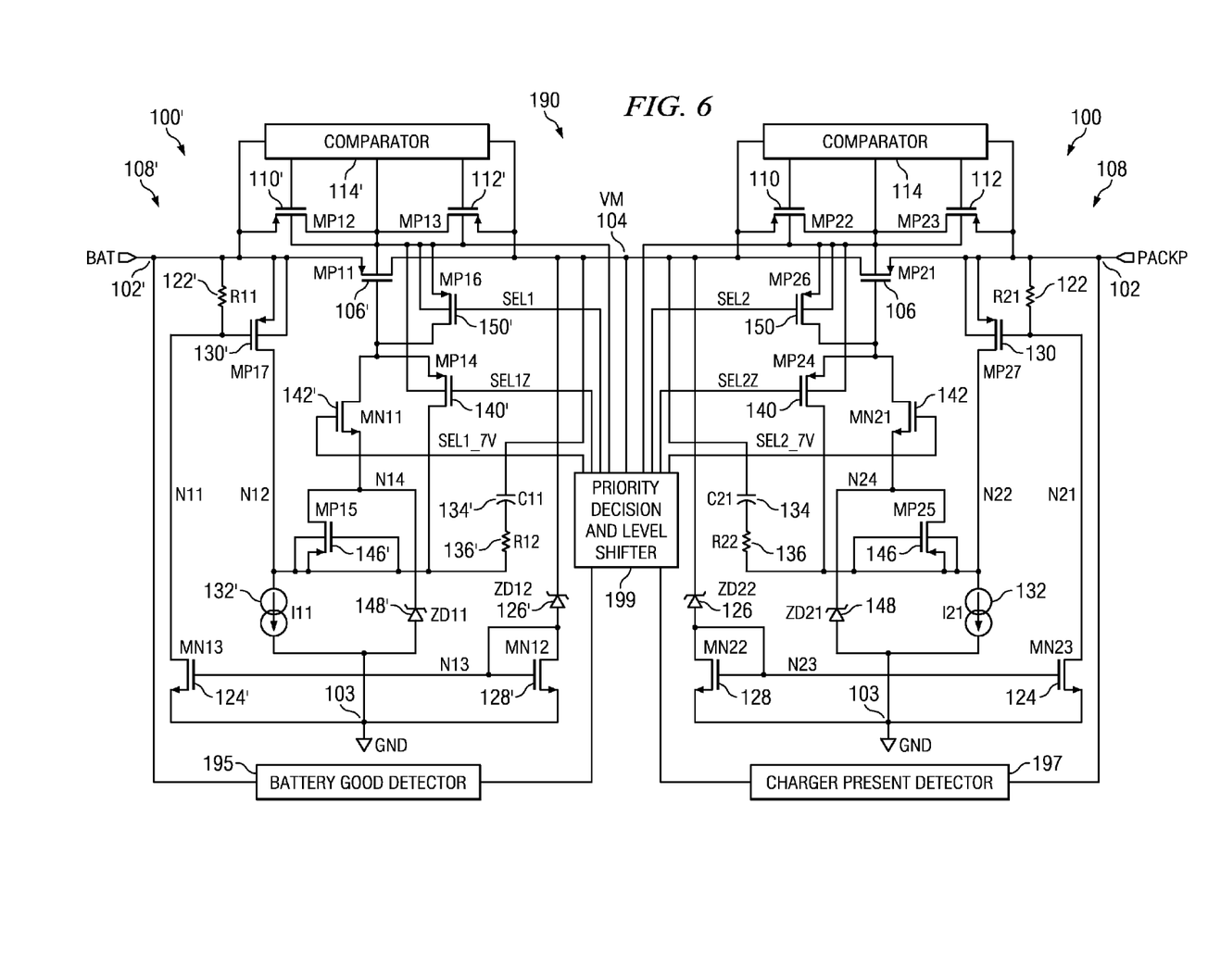
FIG. 6 shows an embodiment of a circuit for power-path management having control circuits as well as PMOS switches for controlling both voltage input and battery input sides.

The control circuits as well as PMOS switches are exemplified in the circuit 190 of FIG. 6, to which reference is now additionally made. The circuit 190 has two sections 100 and 100' of similar construction to the circuit 100 described above with reference to FIG. 4, the parts on the battery input side that correspond to the parts on the voltage input side being denoted by a prime ('). Note also that the voltage input section is seen on the right side of the drawing. On the battery input section 100', a battery good detector 195 determines whether the battery voltage on the battery input node 102' is greater than the power on reset threshold voltage, PORth, and on the voltage input section 100, a charger present detector 197 determines if a charger voltage is present on the charger input node 102. The outputs from both the battery good detector 195 and the charger present detector 197 are connected to a priority decision and level shifter circuit 199.

In operation, the control logic is as follows: (1) If the battery voltage, BAT, on the battery input node 102' is low, while the input voltage, PACKP, on node 102 is high, then PMOS device 106' will be off and PMOS device 106 will be on. This is good for waking up and precharging a zero-volt battery. The input voltage, PACKP, will power the all of the internal circuit blocks. (2) When the battery voltage, BAT, is higher than some specified value, Vbat1, at which all the internal blocks can be properly powered by the battery voltage, BAT, PMOS device 106' is on, and PMOS device 106 is off. (3) For a keychain short or brownout event, with the external FETs on, the input voltage, PACKP, is shorted to ground, or PACKN, for a short period of time, PMOS device 106' and PMOS device 106 are both off, so that the internal circuits are powered by the capacitors 134 and 134'. Capacitors 134 and 134' are chosen such that during this event, the low-drop-out regulator output voltage does not go below the minimum operational voltage of the monitoring and protection circuits.

The control circuits 100 and 100' use the battery voltage, BAT, and input voltage, PACKP, as inputs, and function to generate the gate and backgate voltages on PMOS devices 106 and 106'. For smoothly transferring between different modes of the battery, the circuit 190 uses the charger present detector 197 and the battery good detector 195.

Meanwhile, the comparator 114' generates the signals that turn on and off the PMOS switches 110' and 112' to make the backgate of PMOS device 106' the maximum of the battery voltage, BAT, and the output voltage, VM, on node 104. Similarly the comparator 114 generates the signals the turn on and off the switches 110 and 112 to make the backgate voltage of PMOS device 106 the maximum of the input voltage, PACKP, and the output voltage, VM, on node 104.

The selection of which power path is used is determined by the priority decision and level shifter 199, the charger present detector 197, and the battery good detector 195. In one embodiment, for example, if the battery good detector 195 determines that the battery voltage, BAT, is higher than a power on reset threshold, PORth, (for example, around 2 volts), the battery has a higher priority than the input voltage, PACKP, and a power path is established from the battery input node 102' to the output node 104. If the battery is too low (for example, less than PORth), then the power path from the input voltage, PACKP, on the charger input node 102 to the output node 104 is established, if the presence of a charger is detected. On the other hand, if the presence of a charger is not detected, the control circuit 100' will operate to continue control the switch transistors enable the battery connected to the battery input node 102' to provide power to the output node 104, down to the power on reset threshold, PORth.

Figure 7:
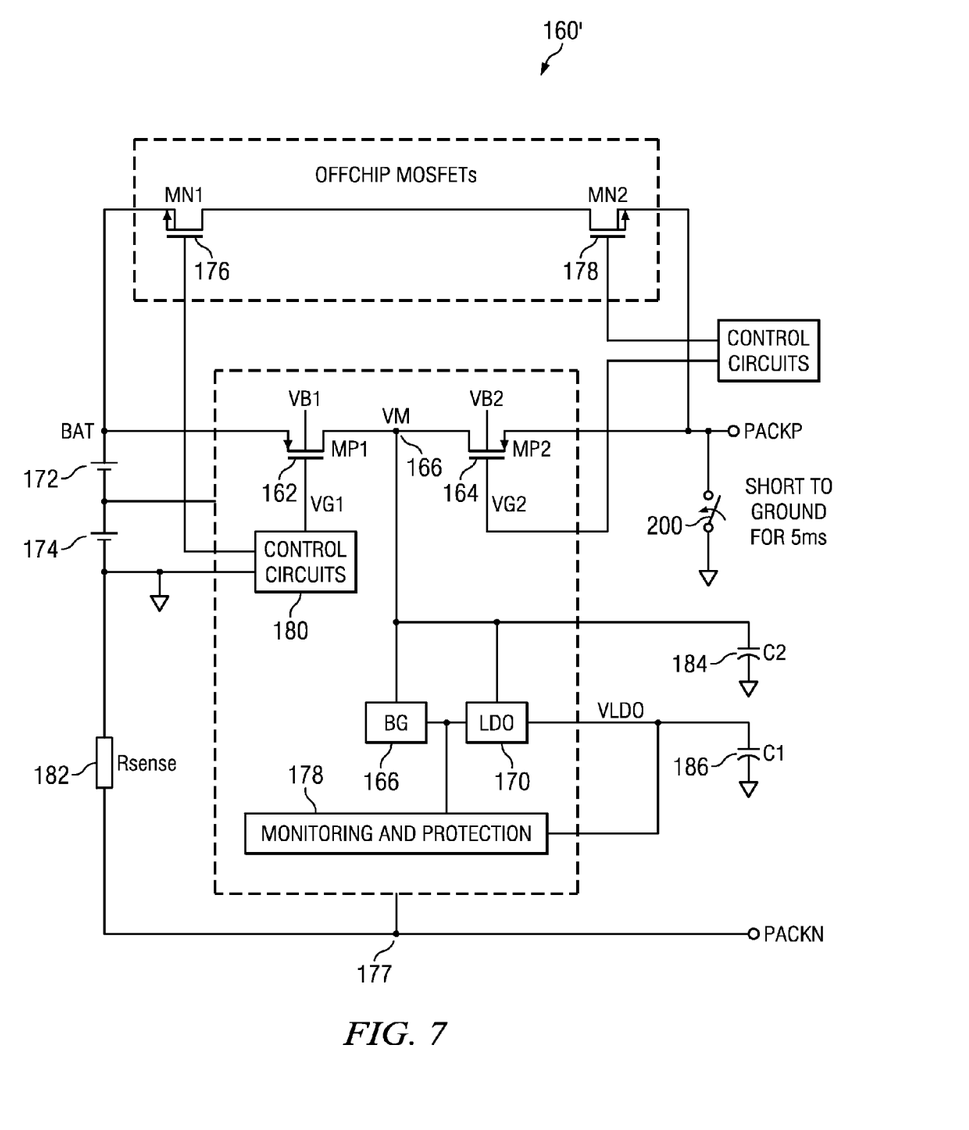
FIG. 7 shows a portion of a circuit embodiment for power-path management that can support momentary brown-out or keychain short events.

The above-described dual-power-path management architecture can also support momentary brown-out or keychain short events by placing large capacitors 184 and 186 at the output node 166 and the output of the low-drop-out regulator 170 as shown in the circuit 160' in FIG. 7, to which reference is now additionally made. During brown-out event or keychain short events, denoted by the switch 200 which may connect the voltage input node briefly to ground, the PMOS devices 162 and 164 are both off so that the internal voltage at node 166 VM will be held by the capacitor 184. The capacitor 186 connected to the low-drop-out regulator 170 will also hold its voltage. When a brownout event occurs, the system can power down some load on the low-drop-out regulator 170 in order to prevent the voltage of the low-drop-out regulator 170 from dropping too quickly.

Figure 8:
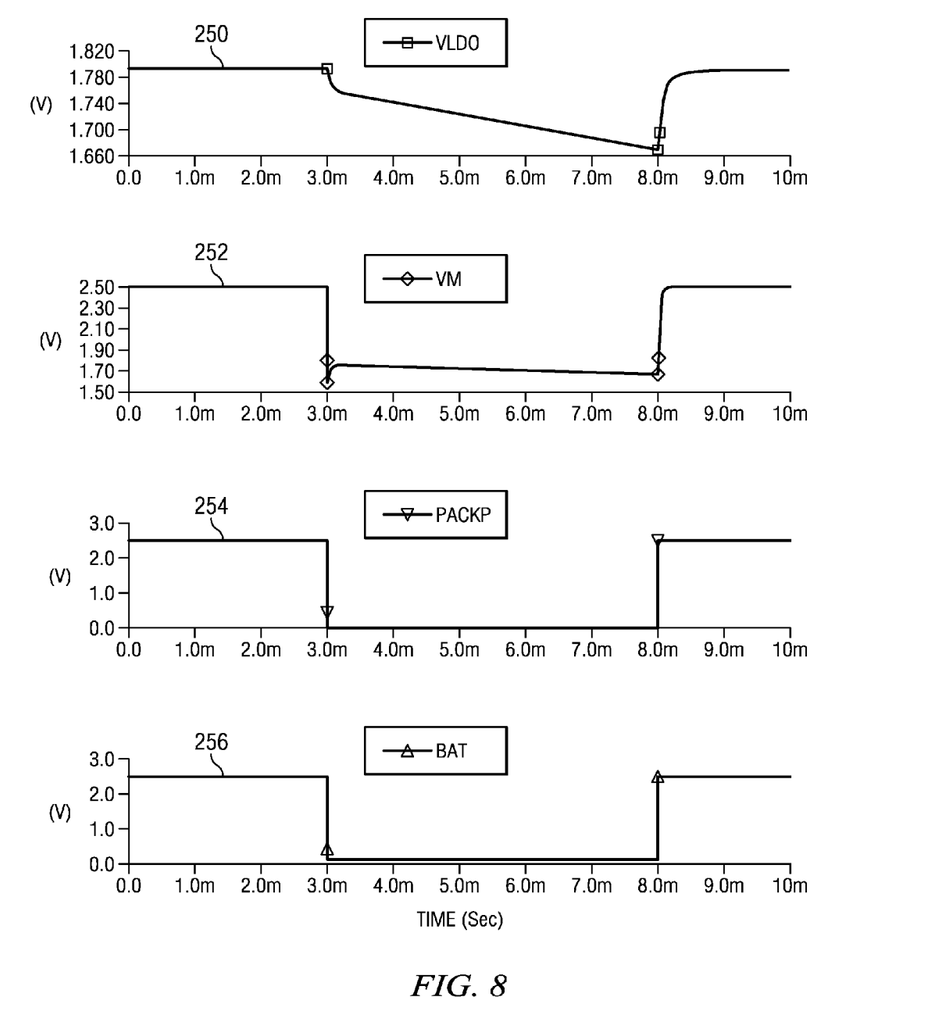
FIG. 8 shows an example simulation illustrating a situation in which the input voltage and the battery voltage are shorted by a 5 ms brown-out event.

FIG. 8, to which reference is now additionally made, shows an example simulation when the input voltage, PACKP, and the battery voltage, BAT, are shorted by a 5 ms brown-out event. Curve 250 shows a graph of the voltage output from the low-drop-out regulator 170 vs. time, and curve 252 is a graph of the voltage output at output node VM 104 vs. time. Curves 254 and 256 are respectively graphs of voltage vs. time of the input voltage, PACKP, and the battery voltage, BAT.

It can be seen that both the PACKP and BAT voltages drop to zero, for example, during a keychain short event or brown-out occurrence. Nevertheless, as shown by curves 250 and 252, during the brown-out time, the low-drop-out regulator 170 drives a load of about 200 μA with its capacitor of about 10 μF.

Electrical connections, couplings, and connections have been described with respect to various devices or elements. The connections and couplings may be direct or indirect. A connection between a first and second electrical device may be a direct electrical connection or may be an indirect electrical connection. An indirect electrical connection may include interposed elements that may process the signals from the first electrical device to the second electrical device.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

The invention claimed is:

1. A battery power-path management circuit, comprising:
   a first control circuit to establish a first power path between a battery input node and an output node when a voltage on said battery input node is larger than a voltage on a charger input node, and to establish a second power path between said charger input node and said output node when said voltage on said charger input node is larger than a voltage on said battery input node;
   said first control circuit being configured to control said second power path to provide power to said output node to enable charging and protecting a battery connected to said battery input node over a battery voltage range extending to zero volts; and
   a second control circuit for independently controlling respective backgates of first and second transistor switches according to voltages applied to said battery input node and said charger input node comprising circuitry for applying a voltage on said battery input node to said backgate of said first transistor switch if said voltage on said battery input node is greater than a voltage on said output node, and circuitry for applying a voltage on said charger input node to said backgate of said second transistor switch if said voltage on said charger input node is ,greater than a voltage on said output node.

2. The battery power-path management circuit of claim 1 wherein said first power path comprises a first PMOS transistor switch and said second power path comprises a second PMOS transistor switch.

3. The battery power-path management circuit of claim 2 wherein said first control circuit comprises circuitry for controlling respective gates of said first and second PMOS transistor switches wherein said battery is connected by said first PMOS transistor switch to said output node in the absence of a voltage on said charger input node.

4. The battery power-path management circuit of claim 1 further comprising circuitry for connecting said charger input node to said battery input node when a voltage on said charger input node is larger than a voltage on said battery input node.

5. The battery power-path management circuit of claim 1 further comprising a voltage storage device to provide a voltage to said output node in the event of a brownout occurrence.

6. The battery power-path management circuit of claim 5 wherein said voltage storage device is a capacitor.

7. A battery power-path management circuit, comprising:
a first switch connected between a battery input node and an output node;
a second switch connected between a charger input node and said output node; and
a first control circuit connected to the output node to control said first and second switches to connect said battery input node to said output node when a voltage on said battery input node is larger than a voltage on said charger input node, and to connect said charger input node to said output node when the voltage on said charger input node is larger than the voltage on said battery input node;
said first control circuit being configured to control said switches to enable charging and protecting a battery connected to said battery input node over a battery voltage range extending to about zero volts; and
a second control cirucit for independently controlling respective backgates of first and second transistor switches according to voltages applied to said battery input node and said charger input node comprising circuitry for applying a voltage on said battery input node to said backgate of said first transistor switch if said voltage on said battery input node is greater than a voltage on said output node, and circuitry for applying a voltage on said charger input node to said backgate of said second transistor switch if said voltage on said charger input node is ,greater than a voltage on said output node.

8. The battery power-path management circuit of claim 7 wherein said first and second switches are first and second MOS transistors.

9. The battery power-path management circuit of claim 8 further comprising circuitry for controlling respective gates of said first and second MOS transistors wherein said battery is connected by one of said MOS transistors to said output node in the absence of a voltage on said charger input node.

10. The battery power-path management circuit of claim 9 wherein said second control circuit controls respective backgates of said first and second MOS transistors according to voltages applied to said charger input node and said battery input node.

11. The battery power-path management circuit of claim 7 wherein if said voltage on said battery input node is below a predetermined threshold and a presence of a charger is detected by said control circuit, then said control circuit establishes a power path from said charger input node to said output node, and if said voltage on said battery input node is below said predetermined threshold and if the presence of a charger is not detected, said control circuit disables all loading on the battery input.

12. The battery power-path management circuit of claim 7 further comprising circuitry for connecting said charger input node to said battery input node when a voltage on said charger input node is larger than a voltage on said battery input node.

13. The battery power-path management circuit of claim 7 further comprising a voltage storage device to provide a voltage to said output node in the event of a brownout occurrence.

14. The battery power-path management circuit of claim 13 wherein said voltage storage device is a capacitor.

15. A method for controlling a power-path between a battery input node, a charger input node, and an output node, comprising:
a first control circuit establishing a first power path between said battery input node and said output node when a voltage on said battery input node is larger than a voltage on said charger input node;
said first control circuit establishing a second power path between said charger input node and said output node to enable a charger connected to said charger input node to provide power to said output node to power control circuitry over a battery voltage range extending to zero volts,
second control circuit for independently controlling respective backgates of first and second transistor switches according to voltages applied to said battery input node and said charger input node comprising circuitry for applying a voltage on said battery input node to said backgate of said first transistor switch if said voltage on said battery input node is greater than a voltage on said output node, and circuitry for applying a voltage on said charger input node to said backgate of said second transistor switch if said voltage on said charger input node is ,greater than a voltage on said output node.

16. The method of claim 15 wherein said establishing a first power path comprises providing a first low resistance switch between said battery input node and said output node, and said establishing a second power path comprises providing a second low resistance switch between said charger input node and said output node.

17. The method of claim 15 further comprising establishing a third power path between said charger input node and said battery input node when said voltage on said charger input node is larger than said voltage on said battery input node.

18. The method of claim 15 further comprising providing a voltage storage device to provide a voltage to said output node in the event of a brownout occurrence.

* * * * *